United States Patent
Haack et al.

(10) Patent No.: US 11,891,560 B2
(45) Date of Patent: Feb. 6, 2024

(54) REFRIGERANT

(71) Applicant: WEISS TECHNIK GMBH, Reiskirchen (DE)

(72) Inventors: Christian Haack, Marburg (DE); David Blaufelder, Giessen (DE); Murat Aydin, Giessen (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 0 days.

(21) Appl. No.: 17/319,525

(22) Filed: May 13, 2021

(65) Prior Publication Data
US 2021/0355357 A1   Nov. 18, 2021

(30) Foreign Application Priority Data
May 14, 2020   (DE) .................. 10 2020 113 111.9

(51) Int. Cl.
C09K 5/04 (2006.01)
F25B 9/00 (2006.01)

(52) U.S. Cl.
CPC .............. C09K 5/045 (2013.01); F25B 9/008 (2013.01); *C09K 2205/106* (2013.01); *C09K 2205/126* (2013.01); *C09K 2205/128* (2013.01); *F25B 2309/06* (2013.01)

(58) Field of Classification Search
CPC .............. C09K 5/045; C09K 2205/106; C09K 2205/126; C09K 2205/128; C09K 2205/122; F25B 9/008; F25B 2309/06; F25B 40/00; F25B 41/347; F25B 2400/0403; F25B 2400/0409; F25B 2400/0411; F25B 2600/2501; F25B 41/20; F25B 2400/12; F25B 2600/0261; F25B 39/00; F25B 9/006; Y02B 30/70; Y02P 20/10
USPC .......................................... 252/67
See application file for complete search history.

(56) References Cited

U.S. PATENT DOCUMENTS

| 2016/0018135 A1 | 1/2016 | Yuzawa et al. |
| 2016/0178246 A1 | 6/2016 | Toyooka et al. |
| 2018/0002586 A1 * | 1/2018 | Low ............ C11D 7/5018 |
| 2020/0071585 A1 * | 3/2020 | Low ............ G06Q 50/26 |

FOREIGN PATENT DOCUMENTS

| DE | 4116274 A1 | 11/1992 | |
| EP | 0344397 A2 | 12/1989 | |
| GB | 2562509 A * | 11/2018 | ........... A62D 1/0057 |
| GB | 2562509 A | 11/2018 | |
| WO | 2017157864 A1 | 9/2017 | |

* cited by examiner

*Primary Examiner* — Douglas J McGinty
(74) *Attorney, Agent, or Firm* — Dickinson Wright PLLC; Andrew D. Dorisio

(57) ABSTRACT

The invention relates to a refrigerant for a cooling device (10) comprising a cooling circuit (11) comprising at least one heat exchanger (12), the refrigerant undergoing a phase transition in the heat exchanger, the refrigerant being a refrigerant mixture composed of a fraction of carbon dioxide ($CO_2$), a fraction of 1,1-difluoroethene and a fraction of at least one other component, wherein the fraction of carbon dioxide in the refrigerant mixture is 45 to 90 mole percent, the fraction of 1,1-difluoroethene being 5 to 40 mole percent.

11 Claims, 5 Drawing Sheets

REFRIGERANT

This application claims the benefit of German Patent Application No. 10 2020 113 111.9 filed on May 14, 2020, the disclosure of which is incorporated herein by reference.

TECHNICAL FIELD

The invention relates to a refrigerant for a cooling device and to a test chamber with the refrigerant and to a use of a refrigerant, the refrigerant for a cooling device which comprises a cooling circuit with at least one heat exchanger in which the refrigerant undergoes a phase transition consisting of a refrigerant mixture composed of a fraction of carbon dioxide, a fraction of 1,1-difluoroethene and a fraction of at least one other component.

BACKGROUND

Refrigerants of this kind typically circulate within a closed cooling circuit of cooling devices and undergo a sequence of different changes in state of matter. Refrigerants should be of such a nature that they can be used in a cooling circuit within a predefined temperature difference. Single-component refrigerants and refrigerant mixtures of at least two components are known from the state of the art. The refrigerants are classified according to the latest version of German industry standard DIN 8960 Section 6 as at the priority date.

As per statutory regulations, a refrigerant must not significantly contribute to the depletion of ozone in the atmosphere or to global warming. This means that essentially no fluorinated or chlorinated substances are to be used as refrigerants, which is why natural refrigerants or gasses are an option. Moreover, a refrigerant should be nonflammable in order to not complicate filling, shipping and operation of a cooling circuit because of any safety regulations that may have to be observed. Also, production of a cooling circuit becomes more expensive if a flammable refrigerant is used because of the constructional measures required in that case. Flammability refers to the refrigerant's property of reacting to ambient oxygen by releasing heat. A refrigerant is flammable in particular if it is classified in fire class C of European standard EN2 and DIN 378 classes A2, A2L and A3 in their latest versions as at the priority date.

Moreover, a refrigerant should have a relatively low $CO_2$ equivalent; i.e., a relative global warming potential (GWP) should be as low as possible in order to avoid indirect damage to the environment in case the refrigerant is released. The GWP indicates how much a defined mass of a greenhouse gas contributes to global warming, carbon dioxide serving as the reference value. The value describes the mean warming effect over a specific period, 100 years being set here for the sake of comparability. For a definition of the relative $CO_2$ equivalent or GWP, reference is made to Intergovernmental Panel on Climate Change (IPCC), Assessment Report, Appendix 8.A, Table 8.A.1 in the latest version as at the priority date.

Refrigerants with a low GWP, such as <2500, have the disadvantage that these refrigerants tend to have a significantly lower cold capacity in the temperature ranges relevant for a cooling circuit than refrigerants with a comparatively higher GWP. A lower GWP can be achieved with refrigerant mixtures that have a comparatively high fraction of carbon dioxide; however, these refrigerant mixtures may have zeotropic properties due to the different substances mixed, which is undesirable in many cooling circuits.

In a zeotropic refrigerant mixture, a phase transition happens across a temperature range which is known as the temperature glide. The temperature glide refers to a difference between the boiling temperature and the dew point temperature at constant pressure. Zeotropic refrigerant mixtures typically contain a high fraction of a nonflammable component, which is characterized by a comparatively high GWP, however. At first glance, carbon dioxide appears to be a suitable component for a refrigerant mixture because it is nonflammable and has a low GWP. In a mixture of carbon dioxide with another component, however, it is essential that a fraction of a carbon dioxide has to be comparatively large if the other component is flammable. This is disadvantageous, however, because carbon dioxide has a freezing temperature or freezing point of $-56.6°$ C., which hardly allows temperatures of up to $-60°$ C. to be achieved at a high carbon dioxide concentration.

Also, the use of refrigerants should be as simple as possible, i.e., not require extensive technical restructuring of a cooling device. With refrigerants having a temperature glide of >3 K in particular, an expansion element and a heat exchanger or evaporator of the cooling circuit in question have to be adjusted to the evaporation temperature of the refrigerant and corresponding control has to be provided. Furthermore, a distinction must be drawn between refrigerants that are designed for static operation of a cooling device, i.e., a cooling device having a temperature at the heat exchanger or evaporator that is substantially constant over a longer period of time, and refrigerants that are designed for a dynamic cooling device, which exhibits comparatively quick temperature changes at the heat exchanger. Dynamic cooling devices of this kind are integrated in test chambers, for example, which means that a refrigerant used has to be usable within a large temperature range.

Test chambers are typically used to test physical and/or chemical properties of objects, in particular devices. For instance, temperature test chambers or climate test chambers in which temperatures in a range of $-60°$ C. to $+180°$ C. can be set are known. In climate test chambers, desired climatic conditions can additionally be set, to which the device or the test material is then exposed for a defined period of time. Test chambers of this kind are often or sometimes realized as mobile devices which are merely connected to a building via required supply lines and comprise all modules needed to control the temperature and climate. The temperature of a test space holding the material to be tested is typically controlled in a circulating air duct within the test space. The circulating air duct forms an air treatment space in the test space, in which heat exchangers for heating or cooling the air flowing through the circulating air duct and the test space are disposed. A fan or ventilator aspirates the air located in the test space and directs it to the respective heat exchangers in the circulating air duct. In this way, the test material can be temperature-controlled or exposed to a defined temperature change. During a test interval, a temperature can repeatedly change between a maximum temperature and a minimum temperature of the test chamber. A test chamber of this kind is known from EP 0 344 397 A2, for example.

The refrigerant circulating in a cooling circuit must be of such a nature that it can be used in the cooling circuit within the aforementioned temperature difference. In particular, a dew point temperature of the refrigerant cannot be higher than a minimum temperature of the temperature range of the cooling circuit that is to be achieved because the minimum temperature would not be achievable otherwise when the refrigerant is evaporated in the heat exchanger serving to cool the test space. The dew point temperature of azeotropic refrigerants is reached immediately behind the expansion element in the heat exchanger. Straight cooling circuits for test spaces require a very high temporal temperature stability of ≤±0.5 K to precisely control the temperature of the test chamber, which cannot be achieved at all or only to a limited degree using zeotropic refrigerants. High temperature stability cannot be achieved in this case because the dew point temperature or a dew point of the zeotropic refrigerant may locally shift as a function of a temperature in the test space in the area of the heat exchanger in the test space because of temperature differences. So the temperature may change during the evaporation and different temperatures may occur at the heat exchanger. Maintaining a spatial temperature distribution of ≤±2 K is difficult when using zeotropic refrigerants since the described temperature layers at the heat exchanger may also occur in the test space.

Refrigerants R23 and R469 A are used, inter alia, as cryogenic temperature refrigerants for test chambers with temperatures of up to −70° C. However, R23 has a GWP of 14,800, which excludes this refrigerant from being used in the future. While R469A does have a significantly lower GWP of 1347, it necessitates restructuring of the cooling circuit of the test chamber in order to be able to compensate for lower performance compared to R23 and the relatively high temperature glide compared to R23.

Furthermore, cooling devices in which a zeotropic refrigerant mixture is successively evaporated are known. This means that components of the refrigerants are evaporated one after the other by means of an expansion element. Cooling devices of this kind are also referred to as mixed fluid cascade systems and are suitable for realizing a substantially static cryogenic temperature.

WO 2017/157864 A1 discloses a refrigerant which contains carbon dioxide and pentafluoroethane among other components. Ranges of 30 to 70 wt % for carbon dioxide and 20 to 80 wt % for pentafluoroethane are indicated for the refrigerant, for example. Difluoromethane as a mixing partner is also disclosed.

DE 41 16 274 A1 relates to a refrigerant which contains carbon dioxide and difluoromethane as mixing partners. Fractions of 5 to 50 wt % of carbon dioxide and 25 to 70 wt % of difluoromethane are indicated, for example.

SUMMARY

Hence, the object of the present invention is to propose a refrigerant for a cooling device, a test chamber with a refrigerant, and a use of a refrigerant which compensate for the disadvantages known from the state of the art.

In the refrigerant according to the invention for a cooling device comprising a cooling circuit with at least one heat exchanger, the refrigerant undergoes a phase transition in the heat exchanger, the refrigerant being a refrigerant mixture composed of a fraction of carbon dioxide, a fraction of 1,1-difluoroethene and a fraction of at least one other component, wherein the fraction of carbon dioxide in the refrigerant mixture is 45 to 90 mole percent, the fraction of 1,1-difluoroethene being 5 to 40 mole percent.

The terms fraction and mole percent refer to a substance amount fraction. The ranges indicated in mol % can also be interpreted as ranges indicated in % by mass.

Carbon dioxide ($CO_2$) is also known as a refrigerant or component under the designation R744, pentafluoroethane ($C_2HF_5$) is known under the designation R125, difluoromethane ($CH_2F_2$) is known under the designation R32, 2,3,3,3-tetrafluoropropene ($C_3H_2F_4$) is known under the designation R1234yf, fluoromethane ($CH_3F$) is known under the designation R41, fluoroform ($CHF_3$) is known under the designation R23, 1,1-difluoroethene ($C_2H_2F_2$) is known under the designation R1132a, ethene ($C_2H_4$) is known under the designation R1150, fluoroethene ($C_2H_3F$) is known under the designation R1141, propane ($C_3H_8$) is known under the designation R290, propene ($C_3H_6$) is known under the designation R1270, hexafluoroethane ($C_2F_6$) is known under the designation R116 and fluoroethane ($CH_2FCH_3$) is known under the designation R161 according to the latest version of German industry standard DIN 8960 as at the priority date of the application.

The invention provides a refrigerant mixture of carbon dioxide and one or more fluorinated refrigerants which have a low GWP and are nonflammable or flammable to a limited degree only. A fraction of carbon dioxide has to be as low as possible because otherwise a freezing point of the refrigerant mixture would rise with an increasing fraction of carbon dioxide. However, a lower fraction of carbon dioxide reduces a GWP-reducing effect of the carbon dioxide. This is why partly fluorinated refrigerants have a significantly higher GWP than carbon dioxide, while also having an improved flame-retardant effect.

As was surprisingly found, a sufficiently low GWP can be achieved using a refrigerant mixture containing a fraction of carbon dioxide of 45 to 85 mole percent, a fraction of 1,1-difluoroethene of 5 to 40 mole percent and at least one other component. Moreover, the negative properties of 1,1-difluoroethene and carbon dioxide can be reduced by adding a third component of the refrigerant mixture. In particular, the use of 1,1-difluoroethene at the indicated mixing ratio with carbon dioxide allows flexible adaptation of the refrigerant to different applications in test chambers by mixing it with the at least one other component. For example, adaptation to existing cooling circuits, achieving specific cryogenic temperatures or maintaining a required temperature stability.

Advantageously, a fraction of carbon dioxide in a refrigerant mixture is 50 to 80 mole percent, preferably 55 to 75 mole percent, and a fraction of 1,1-difluoroethene is 10 to 35 mole percent, preferably 15 to 30 mole percent. In this case, a GWP of the refrigerant mixture can be reduced even further.

The other component may be hexafluoroethane, difluoromethane, pentafluoroethane and/or fluoroform. It has been found that these components are particularly advantageous for adapting the refrigerant to different requirements.

A fraction of carbon dioxide in the refrigerant mixture may be 45 to 75 mole percent, preferably 50 to 70 mole percent, particularly preferably 55 to 65 mole percent.

Advantageously, a fraction of 1,1-difluoroethene may be 5 to 40 mole percent, preferably 10 to 35 mole percent, particularly preferably 20 to 30 mole percent.

Another component may be fluoroform or hexafluoroethane, wherein this fraction may be 1 to 30 mole percent, preferably 5 to 25 mole percent, particularly 10 to 20 mole percent.

Particularly preferably, a fraction of 1,1-difluoroethene may be 1 to 30 mole percent, preferably 5 to 25 mole percent, particularly 10 to 20 mole percent, wherein difluoromethane and pentafluoroethane may be other components, and a fraction of difluoromethane may be 1 to 30 mole percent, preferably 3 to 23 mole percent, particularly preferably 8 to 18 mole percent, and a fraction of pentafluoroethane may be 1 to 30 mole percent, preferably 1 to 20 mole percent, particularly preferably 2 to 12 mole percent. It has been found that a flame-retardant effect of pentafluoroethane is comparatively greater than that of carbon dioxide. At the same time, difluoromethane and fluoroform or hexafluoroethane exhibit a lower freezing temperature with carbon dioxide than with pentafluoroethane. Pentafluoroethane cannot lower a freezing point of the refrigerant mixture as far as difluoromethane with fluoroform or hexafluoroethane, but has a greater flame-retardant effect compared to carbon dioxide, which is advantageous. A disadvantage is that pentafluoroethane has a GWP of 3150, which may therefore be higher than that of other components of the refrigerant mixture.

Another component may be fluoroform or hexafluoroethane, wherein this fraction may be 1 to 30 mole percent, preferably 1 to 20 mole percent, particularly preferably 1 to 10 mole percent.

Advantageously, a fraction of fluoroform may be 1 to 30 mole percent, preferably 5 to 25 mole percent, particularly preferably 10 to 20 mole percent.

According to another embodiment, a fraction of carbon dioxide in the refrigerant mixture may be 55 to 85 mole percent, preferably 60 to 80 mole percent, particularly preferably 65 to 75 mole percent, and a fraction of 1,1-difluoroethene may be 5 to 35 mole percent, preferably 10 to 30 mole percent, particularly preferably 15 to 25 mole percent.

In this case, difluoromethane and pentafluoroethane may be other components, and a fraction of difluoromethane may be 1 to 30 mole percent, preferably 1 to 20 mole percent, particularly preferably 5 to 15 mole percent, and a fraction of difluoroethene may be 5 to 35 mole percent, preferably 10 to 20 mole percent, particularly preferably 14 to 18 mole percent.

In this case, fluoroform and pentafluoroethane may be other components, and a fraction of fluoroform may be 1 to 30 mole percent, preferably 1 to 20 mole percent, particularly preferably 5 to 10 mole percent, and a fraction of pentafluoroethane may be 1 to 30 mole percent, preferably 1 to 20 mole percent, particularly preferably 2 to 6 mole percent.

The refrigerant mixture may be composed of up to three components or of four or more components. Consequently, the refrigerant mixture may be a ternary refrigerant mixture or a quinary refrigerant mixture. It may be provided that the refrigerant mixture does not contain any more components beyond that.

The refrigerant may contain fluoromethane, ethane, 2,3,3,3-tetrafluoropropene, ethene, fluoroethene, ethyne, propane, propene and/or fluoroethane in an amount of up to 30 mole percent each, preferably up to mole percent each, particularly preferably up to 10 mole percent each, as an additional component. Improved properties of the refrigerant can be achieved even with this comparatively low fraction of said component(s).

In the following table, examples of refrigerants according to the embodiments described above are indicated.

TABLE

| Refrigerant | R744 [mol %] | R116 [mol %] | R1132a [mol %] | R32 [mol %] | R125 [mol %] | R23 [mol %] | GWP |
|---|---|---|---|---|---|---|---|
| 1 | 55-65 | 10-20 | 20-30 | 0 | 0 | 0 | 2800-5000 |
|   | 50-70 | 5-25 | 10-35 | 0 | 0 | 0 | 1500-5800 |
|   | 45-75 | 1-30 | 5-40 | 0 | 0 | 0 | 330-6500 |
| 2 | 55-65 | 1-10 | 10-20 | 8-18 | 2-12 | 0 | 570-3400 |
|   | 50-70 | 1-20 | 5-25 | 3-23 | 1-20 | 0 | 430-5300 |
|   | 45-75 | 1-30 | 1-30 | 1-30 | 1-30 | 0 | 410-6700 |
| 3 | 55-65 | 0 | 20-30 | 0 | 0 | 10-20 | 1680-3200 |
|   | 50-70 | 0 | 10-35 | 0 | 0 | 5-25 | 860-3900 |
|   | 45-75 | 0 | 5-40 | 0 | 0 | 1-30 | 170-4600 |
| 4 | 55-65 | 0 | 10-20 | 8-18 | 2-12 | 1-10 | 420-2400 |
|   | 50-70 | 0 | 5-25 | 3-23 | 1-20 | 1-20 | 278-3900 |
|   | 45-75 | 0 | 1-30 | 1-30 | 1-30 | 1-30 | 260-5200 |
| 5 | 65-75 | 5-15 | 15-25 | 0 | 0 | 0 | 1600-4000 |
|   | 60-80 | 1-20 | 10-30 | 0 | 0 | 0 | 340-5000 |
|   | 55-85 | 1-30 | 5-35 | 0 | 0 | 0 | 340-6700 |
| 6 | 65-75 | 5-15 | 15-25 | 5-15 | 1-10 | 0 | 1700-4000 |
|   | 60-80 | 1-20 | 10-30 | 1-20 | 1-20 | 0 | 435-5200 |
|   | 55-85 | 1-30 | 5-35 | 1-30 | 1-30 | 0 | 430-6780 |
| 7 | 65-75 | 0 | 15-25 | 0 | 0 | 5-15 | 880-2500 |
|   | 60-80 | 0 | 10-30 | 0 | 0 | 1-20 | 180-3300 |
|   | 55-85 | 0 | 5-35 | 0 | 0 | 1-30 | 180-4600 |
| 8 | 65-75 | 0 | 15-25 | 5-15 | 1-10 | 5-15 | 1000-2500 |
|   | 60-80 | 0 | 10-30 | 1-20 | 1-20 | 1-20 | 270-3700 |
|   | 55-85 | 0 | 5-35 | 1-30 | 1-30 | 1-30 | 270-5000 |
| 9 | 70-74 | 0 | 14-18 | 0 | 2-6 | 5-10 | 1500-2300 |
|   | 65-80 | 0 | 10-20 | 0 | 1-20 | 1-20 | 270-4500 |
|   | 55-90 | 0 | 5-35 | 0 | 1-30 | 1-30 | 270-7000 | of pentafluoroethane may be 1 to 30 mole percent, preferably 1 to 20 mole percent, particularly 1 to 10 mole percent.

Another component may be fluoroform or hexafluoroethane, wherein this fraction may be 1 to 30 mole percent, preferably 1 to 20 mole percent, particularly 5 to 15 mole percent.

According to another embodiment, a fraction of carbon dioxide in the refrigerant mixture may be 55 to 90 mole percent, preferably 65 to 80 mole percent, particularly preferably 70 to 74 mole percent, and a fraction of 1,1-

In other embodiments, the refrigerant may have a temperature glide of ≤5 K or <5 K. The temperature glide relates to an evaporation pressure of 1 bar and may be between 0.5 K to 25 K. A particularly low temperature glide of ≤5 K may be achieved, inter alia, using refrigerants 1, 3, 5 and 7 indicated in the Table. A temperature glide of >5 K may be achieved using refrigerants 2, 4, 6 and 8 indicated in the table. Using refrigerant 9, a temperature glide of >5 K may be achieved in the example with R744 using 70-74 mol % and a temperature glide of <5 K can may be achieved in the other examples with R744 using 65-80 mol % and 55-90 mol %. For the refrigerants having the temperature glide of >5 K, an internal heat exchanger or recuperator may be necessary for safe operation and for achieving temperatures of <−55° C. in the cooling circuit. In contrast, no internal heat exchanger is needed in order to achieve a high cold capacity for the refrigerants having a temperature glide of ≤5 K. However, a piping of the cooling circuit and a compressor may have to be adapted because of the low density of the respective refrigerants at low evaporation temperatures. Using these refrigerants, only comparatively higher temperatures might be achievable compared to the refrigerants having a temperature glide of >5 K.

The refrigerant may have a relative $CO_2$ equivalent of 2500 over 100 years and/or the refrigerant may be flammable. Consequently, the refrigerant may be of little harm to the environment.

Moreover, the refrigerant may be particularly safe, making it possible for the cooling circuit and a test chamber in particular to be designed more cost-effectively because no special safety measures in terms of flammability of the refrigerant will have to be observed.

In this case, the refrigerant may at least not be classified in fire class C and/or refrigerant safety group A1. Moreover, shipping and transport of the cooling circuit is easier because the cooling circuit can be filled with the refrigerant before being transported, irrespective of the mode of transport. If a flammable refrigerant is used, filling may not be possible until start-up at the installation site. Furthermore, use of the nonflammable refrigerant in the presence of ignition sources is possible.

The test chamber according to the invention for conditioning air comprises a test space which serves to receive test material and which can be sealed against an environment and is temperature-insulated, and a temperature control device for controlling the temperature of the test space, a temperature in a temperature range of −60° C. to +180° C., preferably −70° C. to +180° C., particularly preferably −80° C. to +180° C., being establishable within the test space by means of the temperature control device, the temperature control device having a cooling device comprising a cooling circuit with a refrigerant according to the invention, a heat exchanger, a compressor, a condenser and an expansion element. Regarding the advantages of the test chamber according to the invention, reference is made to the description of advantages of the refrigerant according to the invention.

Unlike in a mixed fluid cascade system, the refrigerant with all components contained in the refrigerant can be evaporated at once by means of the expansion element. Since a freezing point of the carbon dioxide is −56.6° C., refrigerant mixtures that contain a large fraction of carbon dioxide are no longer suitable for achieving temperatures below −56.6° C., on principle. The use of the refrigerant according to the invention, however, allows a dew point temperature of the refrigerant of less than −70° C. to be achieved.

The cooling circuit may have an internal heat exchanger, and the internal heat exchanger may be connected to a high-pressure side of the cooling circuit upstream of the expansion element and downstream of the condenser and to a low-pressure side of the cooling circuit upstream of the compressor and downstream of the heat exchanger. By use of the internal heat exchanger and cooling of the liquefied refrigerant of the high-pressure side by means of the internal heat exchanger, temperatures below −56° C. can be reached easily. The evaporation temperature of the refrigerant cooled by means of the internal heat exchanger can be reduced at the expansion element relative to an evaporation temperature of an uncooled refrigerant. The cold capacity transferred from the low-pressure side to the high-pressure side via the internal heat exchanger can thus be used at least in part, preferably exclusively, to reduce the evaporation temperature of the refrigerant at the expansion element. Furthermore, use of a refrigerant having a temperature glide of >5 K is made possible in the first place because the location of the dew point temperature of the refrigerant or the dew point of the refrigerant can be shifted into the internal heat exchanger in this case. As a consequence of the temperature glide of the zeotropic refrigerant, the achieved dew point temperature of the refrigerant may be comparatively high and thus prevent the heat exchanger from cooling further.

Hence, only part of the refrigerant may be evaporated in the heat exchanger and the unusable part of the wet vapor portion of the refrigerant can be shifted into the internal heat exchanger. On the whole, this allows refrigerants which contain a fraction of carbon dioxide and which, while being environmentally friendly, have zeotropic properties to be used to establish low temperatures in a test space. Moreover, if part of the temperature glide or part of the wet vapor of the refrigerant is shifted from the heat exchanger in the test space into the internal heat exchanger, a comparatively improved temperature stability can be achieved with the zeotropic refrigerant. In this case, a cold capacity output via the heat exchanger can be generated in a section of the temperature glide only, which means that a shift of the dew point of the refrigerant in the cooling circuit has hardly any impact on a temperature stability of the heat exchanger. Furthermore, a single heat exchanger may be used to cool a fluid, i.e., the air in the test space, in this case.

The heat exchanger may be dimensioned in such a manner that only part of the refrigerant can evaporate in the heat exchanger. This results in the advantage that the dew point or the location of the dew point temperature of the refrigerant can be shifted out of the heat exchanger into the internal heat exchanger. Because of a temperature glide of the zeotropic refrigerant, partial evaporation of the refrigerant in the heat exchanger achieves a lower temperature in the heat exchanger than the following remaining evaporation of the refrigerant in the internal heat exchanger.

In one embodiment of the test chamber, the heat exchanger may be disposed in the test space. In this case, the heat exchanger may also be disposed in an air treatment space of the test space so that air circulated by a fan can come into contact with a heat exchanger. In this way, a circulated amount of air of the test space can be cooled directly in the test space by means the cooling device via the heat exchanger. The test chamber may have the cooling circuit as a sole, single cooling circuit. In this case, the cooling circuit is connected directly to the test space.

In another embodiment of the test chamber, the condenser may be realized as a cascade heat exchanger of another cooling circuit of the cooling device. Accordingly, the test chamber may have at least two cooling circuits, in which case the cooling circuit may form a second stage of the cooling device and another cooling circuit, which is disposed upstream of the cooling circuit, may form a first stage of the cooling device. In this case, the condenser serves as a cascade heat exchanger or a heat exchanger for the cooling circuit. This embodiment of a test chamber allows particularly low temperatures to be established in the test space.

The temperature control device may have a heating device comprising a heater and a heating heat exchanger in the test space. The heating device may be an electric resistance heater which heats the heating heat exchanger in such a manner that the temperature in the test space can be raised by means of the heating heat exchanger. If the heat exchanger and the heating heat exchanger can be specifically controlled by means of a control device to cool or heat the air circulated in the test space, a temperature in the temperature range indicated above can be established within the test space by means of the temperature control device. A temperature stability over time of ±1 K, preferably ±0.3 K to ±0.5 K or less than ±0.3 K, may be established in the test space during a test interval irrespective of the test material or of an operating state of the test material. A test interval is a segment of a full test period in which the test material is exposed to a substantially constant temperature or climatic condition. The heating heat exchanger may be combined with the heat exchanger of the cooling circuit in such a manner that a shared heat exchanger body through which the refrigerant can flow and which has heating elements of an electric resistance heater can be realized. The condenser may be cooled with air, water or another coolant. In principle, the condenser can be cooled using any suitable fluid. The essential aspect is that the thermal load generated at the condenser is discharged via the cooling air or the cooling water in such a manner that the refrigerant can condense until it is completely liquefied.

A first bypass having at least one controllable second expansion element may be realized in the cooling circuit, in which case the first bypass may be connected to the cooling circuit upstream of the internal heat exchanger and downstream of the condenser and the first bypass may be realized as a controllable additional internal cooling system. The first bypass may thus form a re-injection device for refrigerant. Accordingly, refrigerant can be recycled from the controllable second expansion element in the internal heat exchanger on the low-pressure side. In this case, the first bypass may be connected to the low-pressure side of the cooling circuit upstream of the internal heat exchanger and downstream of the heat exchanger. The refrigerant cooled or having its temperature level lowered by the second expansion element may be led through the internal heat exchanger and intensify cooling of the refrigerant on the high-pressure side of the internal heat exchanger. Also, a cooling capacity of the internal heat exchanger can be controlled even more precisely in this way.

A second bypass comprising at least one third expansion element may be formed in the cooling circuit, in which case the second bypass bypasses the expansion element downstream of the condenser and upstream of the internal heat exchanger and the refrigerant can be metered by means of the third expansion element in such a manner that a suction gas temperature and/or a suction gas pressure of the refrigerant can be controlled upstream of the compressor on the low-pressure side of the cooling circuit. In this way, potential overheating and damage of the compressor, which may be a compressor device, for example, can be prevented among other things. Consequently, gaseous refrigerant located upstream of the compressor can be cooled via the second bypass by actuation of the third expansion element by adding still-liquid refrigerant. The third expansion element can be actuated by means of a control device which itself is coupled to a pressure and/or temperature sensor in a cooling circuit upstream of the compressor. Particularly advantageously, a suction gas temperature of ≤30° C. can be set via the second bypass. Also, the refrigerant can be metered in such a manner that an operating time of the compressor can be controlled. On principle, it is disadvantageous for the compressor or compressor device to be switched on and off repeatedly. A service life of a compressor can be prolonged if the compressor operates for longer periods of time. A refrigerant can be led past the expansion element or the condenser via the second bypass in order to delay an automated deactivation of the compressor and to prolong an operating time of the compressor, for example.

Another bypass comprising at least one other expansion element may be formed in the cooling circuit, the other bypass bypassing the compressor downstream of the compressor and upstream of the condenser in such a manner that a suction gas temperature and/or a suction gas pressure of the refrigerant can be controlled upstream of the compressor on the low-pressure side of the cooling circuit and/or that a pressure difference between the high-pressure side and a low-pressure side of the cooling circuit can be equalized. The second bypass may additionally be equipped with a settable or controllable valve, such as a magnetic valve. Connecting the high-pressure side and the low-pressure side via the other expansion element ensures that the gaseous refrigerant thus compressed gradually flows from the high-pressure side to the low-pressure side of the cooling circuit in the event of a system standstill. This also ensures gradual pressure equalization between the high-pressure side and the low-pressure side even when the expansion element is closed. A cross-section of the other expansion element may be dimensioned in such a manner that the refrigerant flowing from the high-pressure side to the low-pressure side has only a marginal impact on the normal operation of the cooling device. At the same time, a gaseous refrigerant located upstream of the compressor may be cooled by adding the liquid refrigerant via the other bypass.

Furthermore, the internal heat exchanger may be realized as a sub-cooling section or a heat exchanger, in particular a plate heat exchanger. The sub-cooling section may simply be realized by two line sections of the cooling circuit that are in contact with each other. The expansion element may have a throttle and a magnetic valve, in which case refrigerant can be metered via the throttle and the magnetic valve. The throttle may be a settable valve or a capillary via which refrigerant is routed by means of the magnetic valve. The magnetic valve itself may be actuated by means of a control device.

Also, the temperature control device may comprise a control device comprising at least one pressure sensor and/or at least one temperature sensor in the cooling circuit, in which case a magnetic valve can be actuated by means of the control device as a function of a measured temperature and/or pressure. The control device may comprise means for data processing which process sets of data from sensors and control the magnetic valves. In this case, a function of the cooling device may also be adjusted to the refrigerant used via an appropriate computer program, for example. Furthermore, the control device may signal a malfunction and initiate a shut-down of the test chamber, if necessary, in order to protect the test chamber and the test material from damage due to critical or undesirable operating states of the test chamber.

When a refrigerant consisting of a refrigerant mixture composed of a fraction of carbon dioxide of 45 to 90 mole percent, a fraction of 1,1-difluoroethene of 5 to 40 mole percent and a fraction of another component is used according to the invention, the refrigerant is used to condition air in a test space of a test chamber, the test space serving to receive test material and being sealable against an environment and temperature-insulated, a cooling device of a temperature control device of the test chamber comprising a cooling circuit with the refrigerant, a heat exchanger, a compressor, a condenser and an expansion element is used to establish a temperature in a temperature range of −60° C. to +180° C., preferably −70° C. to +180° C., particularly preferably −80° C. to +180° C., within the test space. By means of an internal heat exchanger of the cooling circuit, which may be connected to a high-pressure side of the cooling circuit upstream of the expansion element and downstream of the condenser and to a low-pressure side of the cooling circuit upstream of the compressor and downstream of the heat exchanger, the refrigerant of the high-pressure side may be cooled, the cooling of the refrigerant of the high-pressure side by means of the internal heat exchanger being usable to lower an evaporation temperature at the expansion element.

During lowering of the evaporation temperature of the refrigerant of the high-pressure side, a suction pressure of the refrigerant of the low-pressure side can be kept constant. A greater system complexity, such as in the form of additional control of the suction pressure and control of the expansion element as a function of the suction pressure, is not necessarily required in that case. In particular, the compressor may also be operated at constant output irrespective of an operating state of the cooling circuit. When piston pumps are used as compressors in particular, it is essential for them to be in operation for long periods of time and at a constant speed in order to achieve a long service live.

The refrigerant of the high-pressure side may be cooled by the refrigerant of the low-pressure side at a constant suction pressure on the low-pressure side by means of the internal heat exchanger. Consequently, the refrigerant can evaporate at constant suction pressure on an evaporation section of the cooling circuit from the expansion element up to and including the internal heat exchanger. If the suction pressure or evaporation pressure of the refrigerant is constant, the refrigerant can evaporate from the expansion element at a low evaporation temperature to the internal heat exchanger at a high evaporation temperature according to the temperature glide of the refrigerant. The dew point temperature resulting from the temperature glide may be higher than the temperature of the fluid to be cooled or of the air in the test space. Once an evaporation temperature of the refrigerant is equal to the temperature of the air to be cooled in the test space at the same suction pressure, the air cannot be cooled any further. However, the dew point temperature reached in the other heat exchanger is lower than the liquid temperature of the refrigerant on the high-pressure side of the internal heat exchanger, which means that a liquid temperature of the refrigerant can be reduced further. Accordingly, an evaporation temperature downstream of the expansion element can be lowered without changing the suction pressure, allowing further cooling of the air in the test space to be achieved.

Only part of the refrigerant may be evaporated in the heat exchanger. Thus, a first portion of the refrigerant routed via the expansion element can be evaporated in the heat exchanger and a second portion of the refrigerant can be evaporated in the internal heat exchanger. An evaporation section of the cooling circuit within which the refrigerant evaporates may extend from the expansion element as far as to the internal heat exchanger. The evaporation section may run through the internal heat exchanger, in which case a dew point of the refrigerant may be located at an exit of the internal heat exchanger upstream of the compressor. A first portion/second portion ratio may change during operation of the cooling circuit as a function of a temperature in the test space or at the heat exchanger. For example, a comparatively large temperature difference between the temperature of the heat exchanger and a temperature in the test space may lead to accelerated heating of the refrigerant in the heat exchanger, which results in a shift of the dew point of the refrigerant toward an entry of the internal heat exchanger or an exit of the heat exchanger upstream of the compressor. This kind of shift of the dew point can be tolerated as long as no comparatively low temperature or target temperature has been established in the test space yet. When the temperature of the heat exchanger approaches the temperature in the test space, the dew point shifts and the second portion thus grows relative to the first portion of the refrigerant.

The refrigerant may be metered and evaporated in the heat exchanger in a clocked manner during a time interval. For example, the expansion element may be a magnetic valve configured to be controlled by means of a control device. The clocked operation of the magnetic valve, i.e., of the expansion element, allows targeted feeding of only low amounts of refrigerant to the heat exchanger. In particular the maintenance of low temperatures often requires only a low cold capacity. The latter can be generated by metering an amount of refrigerant evaporating at the heat exchanger. Said metering can be achieved in a particularly simple manner by clocked opening and closing of the expansion element during a time interval. Clocked opening and closing means in particular a constant sequence of cycles.

The evaporation temperature of the refrigerant of the high-pressure side can be lowered in a self-controlled manner. Depending on the temperature at the heat exchanger, refrigerant no longer evaporating can be discharged from the heat exchanger in the flow direction because the temperature at the heat exchanger is no longer sufficient to cause a phase transition of the refrigerant in this case. Thus, wet vapor or liquid refrigerant is re-evaporated in the internal heat exchanger because here a temperature difference between the high-pressure side and the low-pressure side can always be greater than at the heat exchanger. If a temperature of the liquid refrigerant upstream of the expansion element is reduced by means of the internal heat exchanger by the heat exchange at the internal heat exchanger, the energy density of the refrigerant upstream of the expansion element and the temperature difference thus achievable at the heat exchanger increase. The interaction of the expansion element, the heat exchanger and the internal heat exchanger does not have to be controlled, in principle.

In particular, the constant suction pressure may also be maintained during lowering of the evaporation temperature of the refrigerant of the high-pressure side by means of the internal heat exchanger. Accordingly, the cooling of the refrigerant of the high-pressure side via the internal heat exchanger can also be exploited in part or exclusively to lower an evaporation temperature of the refrigerant at the expansion element.

A dew point temperature of the refrigerant may be higher than a minimum temperature of the temperature range. In the test chambers known from the state of the art, the minimum temperature of the temperature range can no longer be established with a refrigerant of this kind in that case, but a comparatively higher minimum temperature, which substantially corresponds to the dew point temperature of the refrigerant. In the test chamber according to the invention, however, a refrigerant whose dew point temperature is higher than an achievable minimum temperature of the temperature range can be used because the liquefied refrigerant on the high-pressure side can be cooled by means of the internal heat exchanger, which means that an evaporation temperature of the refrigerant at the expansion element can be comparatively lower.

The refrigerant can be evaporated absolutely at a suction pressure or evaporation pressure in a pressure range of 0.3 to 5 bar. Use of the refrigerant within that pressure range allows cost-effective production of the cooling circuit because no special pressure-resistant modules and components have to be used to construct the low-pressure side of the cooling circuit.

Also, the refrigerant can be condensed absolutely at a condensation pressure in a pressure range of 5 to 35 bar. Here, too, the high-pressure side can be constructed using modules and components that do not have to be adapted to comparatively higher pressures.

BRIEF DESCRIPTION OF THE DRAWING FIGURES

Hereinafter, preferred embodiments of the invention will be explained in more detail with reference to the accompanying drawings.

DETAILED DESCRIPTION

Figure 1:
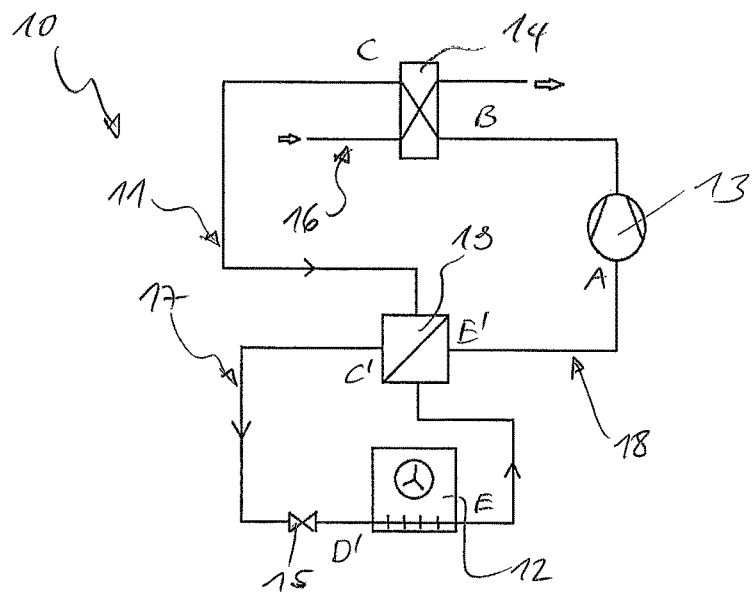
FIG. 1 is a schematic illustration of a first embodiment of a cooling device.

FIG. 1 shows a first embodiment of a cooling device 10 of a test chamber (not shown). Cooling device 10 comprises a cooling circuit 11 with a refrigerant, a heat exchanger 12, a compressor 13, a condenser 14 and an expansion element 15. Condenser 14 is cooled by another cooling circuit 16 in the case at hand. Heat exchanger 12 is disposed in a test space (not shown) of the test chamber. Furthermore, cooling circuit 11 has a high-pressure side 17 and a low-pressure side 18, to which an internal heat exchanger 19 is connected.

Figure 2:
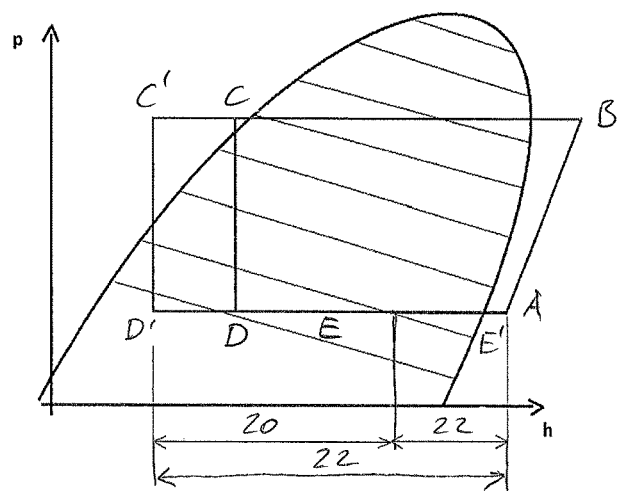
FIG. 2 is a pressure-enthalpy diagram for a refrigerant.

FIG. 2 shows a pressure-enthalpy diagram (log p/h diagram) for the refrigerant circulating in cooling circuit 11, the refrigerant being a zeotropic refrigerant. According to a combined view of FIGS. 1 and 2, starting from position A, the refrigerant upstream of compressor 13 is aspirated and compressed, whereby a pressure is achieved according to position B. The refrigerant is compressed by means of compressor 13 and is subsequently liquefied in condenser 14 according to position C. The refrigerant passes through internal heat exchanger 19 on high-pressure side 17, where it is cooled further, position C' upstream of expansion element 15 thus being reached. By means of internal heat exchanger 19, the portion of the wet vapor area (positons E to E') not usable in heat exchanger 12 can be used to further reduce a temperature of the refrigerant (positions C' to C). At expansion element 15, the refrigerant is relaxed (positions C' to D') and partially liquefied in heat exchanger 12 (positions D' to E). Then, the wet vapor of the refrigerant enters internal heat exchanger 19 on low-pressure side 18, where the refrigerant is re-evaporated until the dew-point temperature or the dew point of the refrigerant is reached at position E'. Hence, a first subsection 20 of an evaporation section 22 of the refrigerant runs through heat exchanger 12, a second subsection 21 of evaporation section 22 running through internal heat exchanger 19. The essential aspect is that a suction pressure of compressor 13 on low-pressure side 18 is kept constant on evaporation section 22 even if the evaporation temperature at expansion element 15 changes.

The refrigerant may be refrigerant 2, 4, 6, 8 or 9 from the Table above. These refrigerants do not contain more than three components and have a high temperature glide of >5 K, which is why internal heat exchanger 19 is necessary for safe operation and for achieving temperatures of <−55° C. As described in connection with FIG. 1, with these refrigerants, a cold capacity usable at the heat exchanger 12, i.e., at the test space (not shown), is used in heat exchanger 19 to sub-cool the liquid refrigerant upstream of expansion element 15. When refrigerants having a temperature glide of >5 K are used, this effect is particularly pronounced and an increase in performance is therefore correspondingly high. A control via an elaborate sensor system is not necessary. However, dynamic load changes, i.e., temperature changes, are possible to a limited degree only because of the inertia of cooling circuit 16 and of cooling device 10. Moreover, the refrigerant located in the test space can be evaporated by heating heat exchanger 12.

Figure 3:
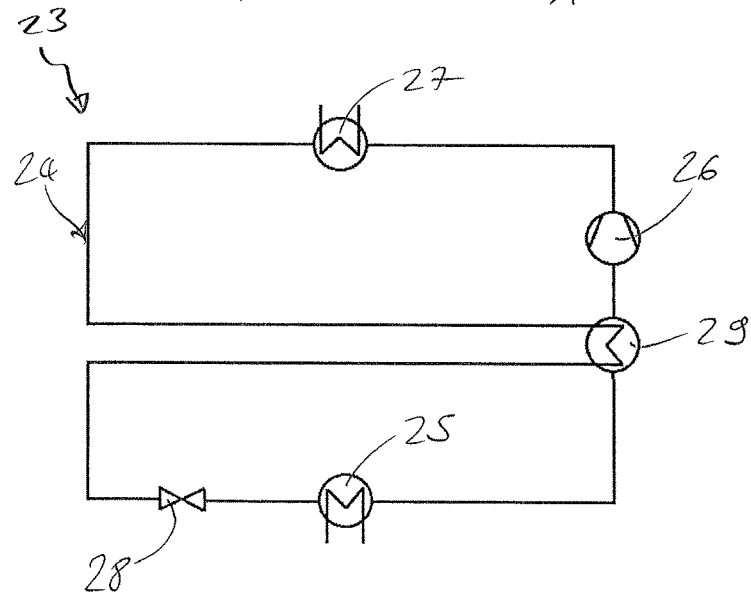
FIG. 3 is a schematic illustration of a second embodiment of a cooling device.

FIG. 3 shows a schematic illustration of a simplest embodiment of a cooling device 23, cooling device 23 being self-controlling. Cooling device 23 comprises a cooling circuit 24 with a heat exchanger 25, a compressor 26, a condenser 27, an expansion element 28 and an internal heat exchanger 29. Depending on a temperature at heat exchanger 25, refrigerant not fully evaporated escapes from heat exchanger 25 because the temperature at heat exchanger 25 or in a test space (not shown) is no longer high enough to cause a phase transition. In this case, refrigerant still liquid is re-evaporated in internal heat exchanger 29 because a temperature difference there has to be greater than at heat exchanger 25 at all times. Once the temperature of the liquid refrigerant upstream of expansion element 28 has been reduced by heat exchange in internal heat exchanger 29, the energy density and the temperature difference achievable with it at heat exchanger 25 increase. Cooling device 23 does not require elaborate control by way of sensors etc.

Figure 4:
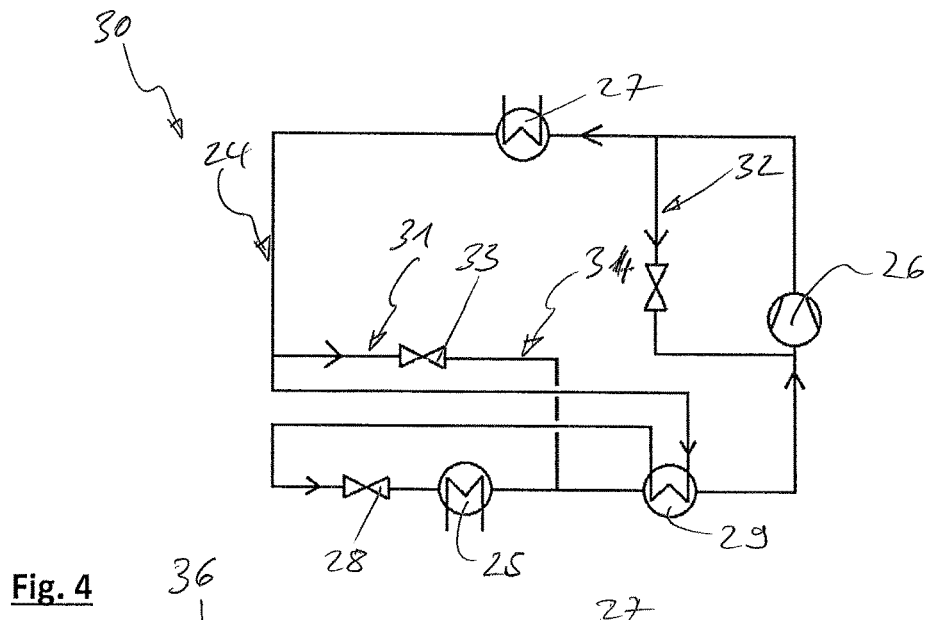
FIG. 4 is a schematic illustration of a third embodiment of a cooling device.

FIG. 4 shows a cooling device 30 which differs from the cooling device of FIG. 3 in that it has a first bypass 31 and a second bypass 32. A controllable second expansion element 33 is disposed in first bypass 31, first bypass 31 being configured as an additional internal cooling system 34. First bypass 31 is connected to cooling circuit 24 immediately downstream of condenser 27 upstream of internal heat exchanger 29 and downstream of heat exchanger 25 and upstream of internal heat exchanger 29. First bypass 31 thus bypasses expansion element 28 with heat exchanger 25, internal heat exchanger 29 being suppliable with evaporating refrigerant via second expansion element 33. A suction gas mass flow introduced into internal heat exchanger 29 can be cooled additionally by means of first bypass 31 in case of high suction gas temperatures, which may be caused by heat exchanger 25. In this way, evaporation of refrigerant upstream of the expansion element can be precluded. Hence, first bypass 31 can be used to react to changing load cases of cooling device 30. Second bypass 32 has a third expansion element 35 and is connected to cooling circuit 24 downstream of condenser 27 and upstream of internal heat exchanger 29 and downstream of internal heat exchanger 29 and upstream of compressor 26. This allows a suction gas mass flow upstream of compressor 26 to be reduced far enough via second bypass 32 to avoid inadmissibly high final compression temperatures.

Figure 5:
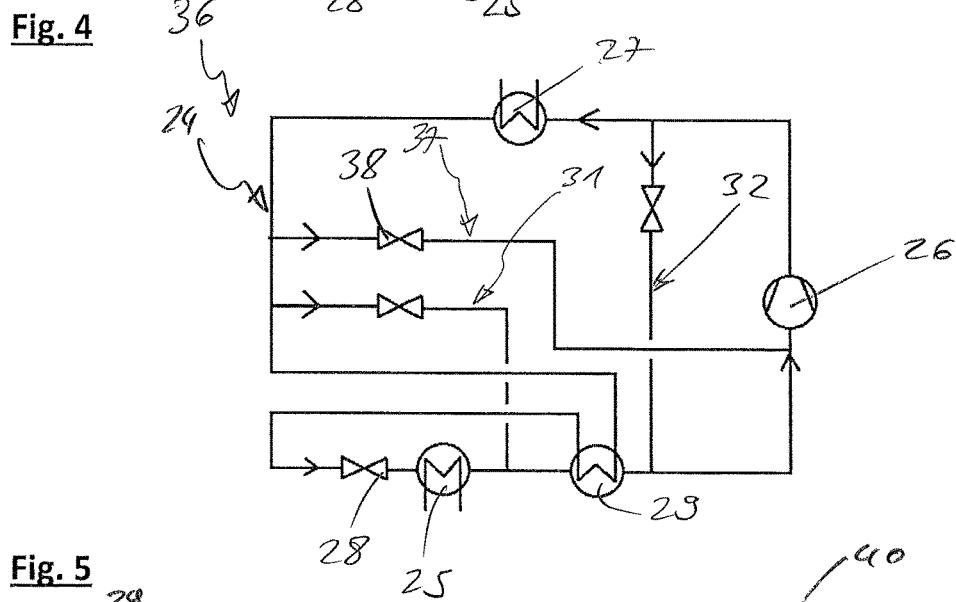
FIG. 5 is a schematic illustration of a fourth embodiment of a cooling device.

FIG. 5 shows a cooling device 36, which differs from the cooling device of FIG. 4 in that it has another bypass 37. Other bypass 37 has another expansion element 38 and is connected to cooling circuit 24 downstream of condenser 27 and upstream of internal heat exchanger 29 and downstream of internal heat exchanger 29 and upstream of compressor 26.

First bypass 31 makes it possible to react to changing load cases. So a suction gas mass flow can be introduced into internal heat exchanger 19 and additionally cooled by reinjection via first bypass 31 in the case of high suction gas temperatures which may be caused by heat exchanger 25. Thus, it can be ensured that no evaporation can occur upstream of expansion element 28. Furthermore, a reinjection via other bypass 37 can reduce the suction gas temperature upstream of compressor 26 far enough for excessively high compression end temperatures to be avoided. This makes it possible for refrigerant having a temperature glide of >5 K to be used in cryogenic temperature applications even in the case of highly dynamic load changes.

Figure 6:
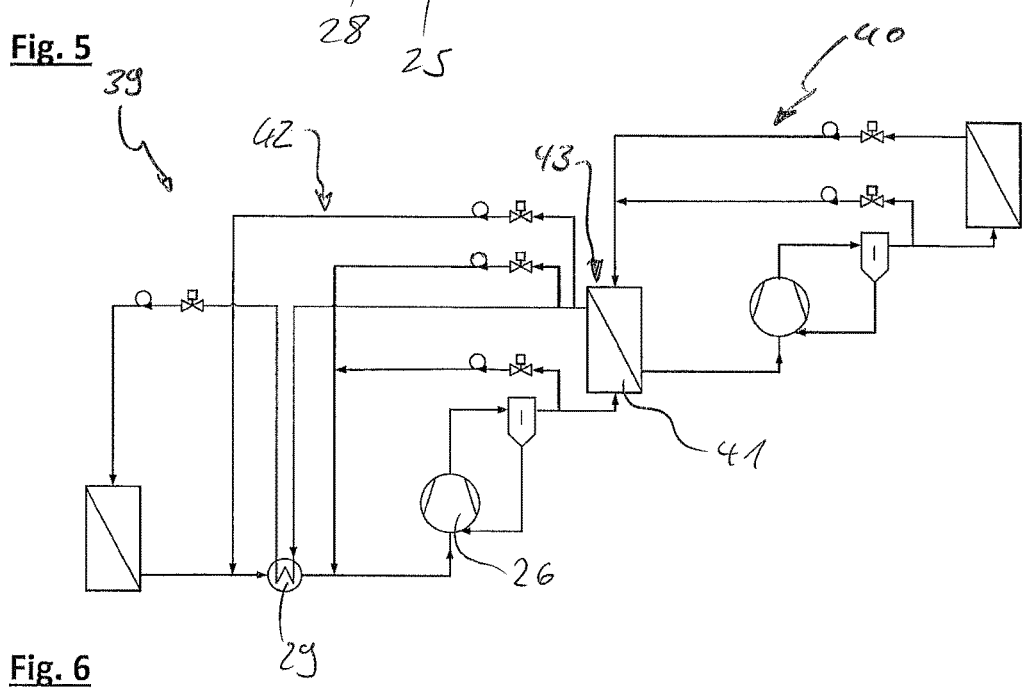
FIG. 6 is a schematic illustration of a fifth embodiment of a cooling device.

FIG. 6 shows a cooling device 39, which differs from the cooling device of FIG. 5 in that it has another cooling circuit 40. Other cooling circuit 40 serves to cool a condenser 41 of a cooling circuit 42. Condenser 41 is realized as a cascade heat exchanger 43 in the case at hand.

Figure 7:
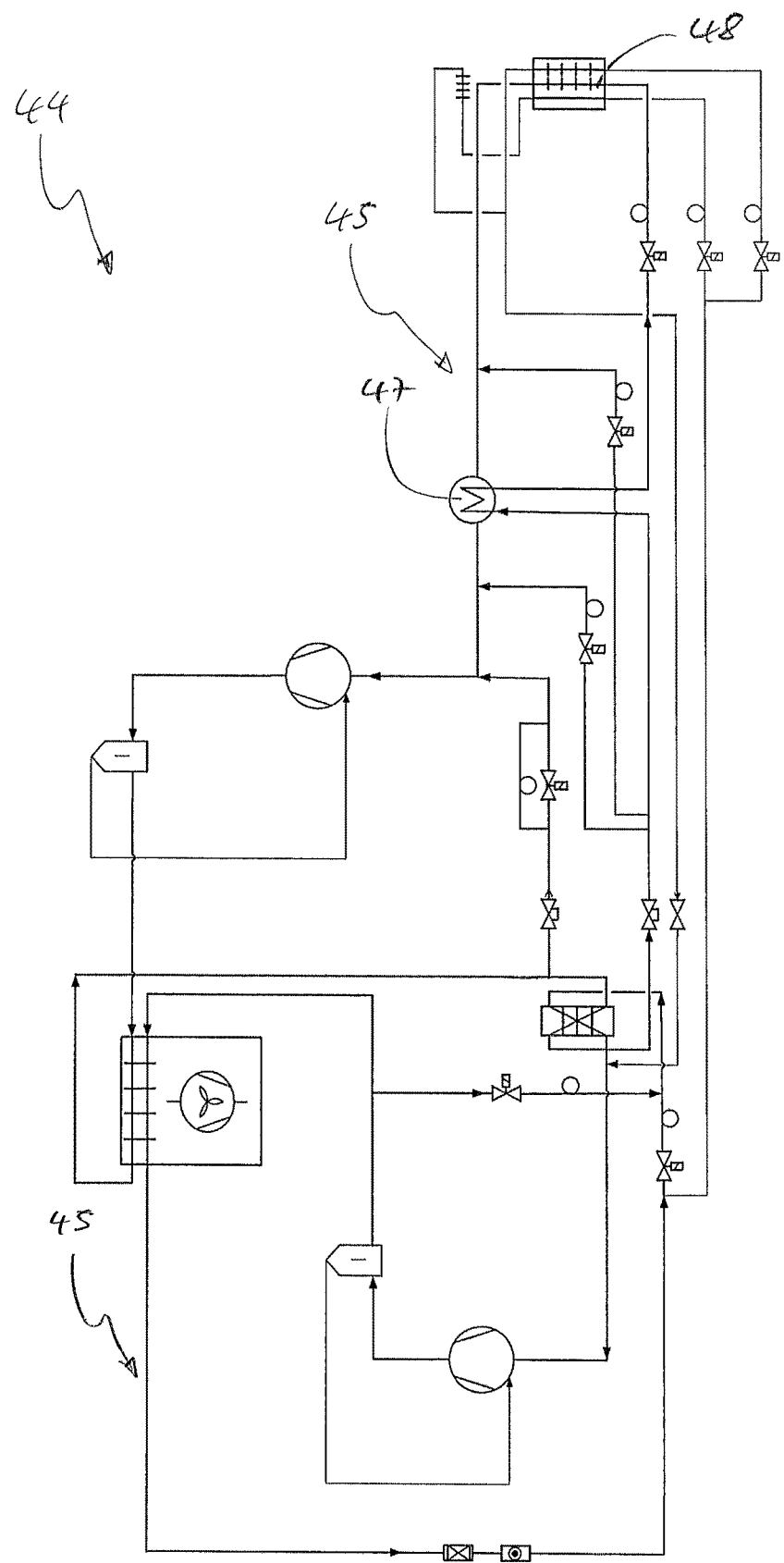
FIG. 7 is a schematic illustration of a sixth embodiment of a cooling device.

FIG. 7 shows a cooling device 44 having a cooling circuit 45 and another cooling circuit 46 und, in particular, an internal heat exchanger 47 in cooling circuit 45. In the case at hand, a heat exchanger 48 is disposed in a temperature-insulated test space of a test chamber (not shown).

Figure 8:
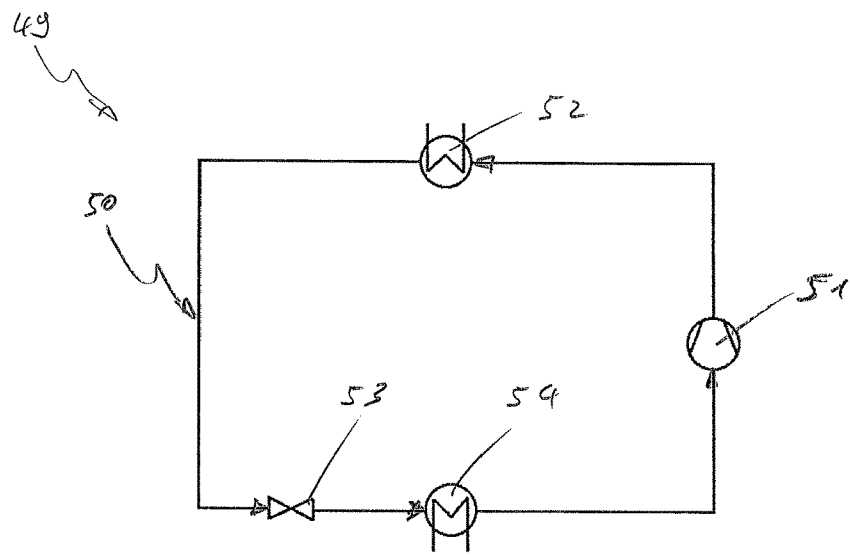
FIG. 8 is a schematic illustration of a seventh embodiment of a cooling device.

FIG. 8 shows a schematic illustration of a simplest embodiment of a cooling device 49 without an internal heat exchanger. A cooling circuit 50 of cooling device 49 is realized with a compressor 51, a condenser 52, an expansion element 53 and a heat exchanger 54 in a temperature-insulated test space of a test chamber (not shown).

A refrigerant circulating in cooling circuit 50 may be one of refrigerants 1, 3, 5, 7 and 9 from the Table above. These refrigerants have a temperature glide of ≤5 K, which is why no internal heat exchanger is necessary for safe operation and for achieving temperatures of <55° C. The low density of the respective refrigerant makes it necessary for compressor 51 and the piping of cooling circuit 50 to be adapted accordingly in the case of low evaporation temperatures.

Figure 9:
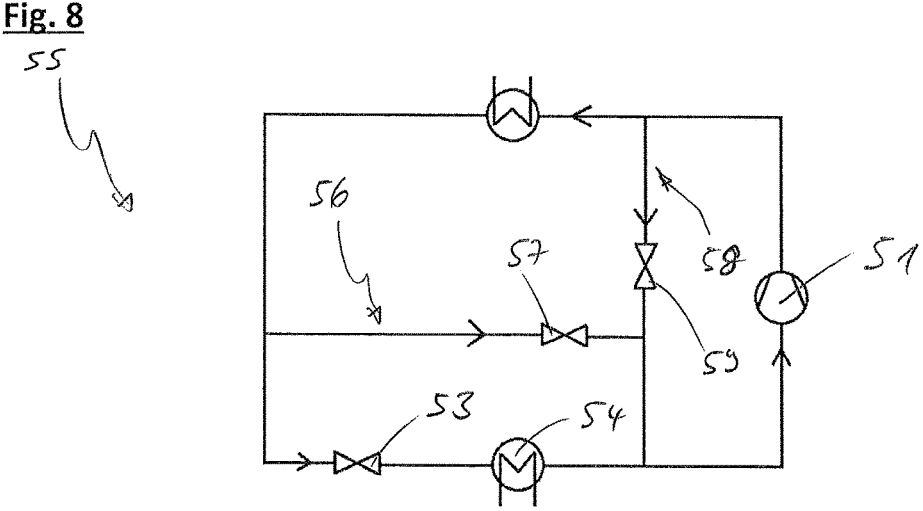
FIG. 9 is a schematic illustration of an eighth embodiment of a cooling device.

FIG. 9 shows a cooling device 55, which differs from the cooling device of FIG. 8 in that a first bypass 56 having a first expansion element 57 and a second bypass 58 having a second expansion element 59 are provided. First bypass 56 and second bypass 58 can be used as described in connection with FIG. 4. So a suction temperature of compressor 51 and an evaporation pressure can be set or controlled by means of first expansion element 57 and second expansion element 59.

Figure 10:
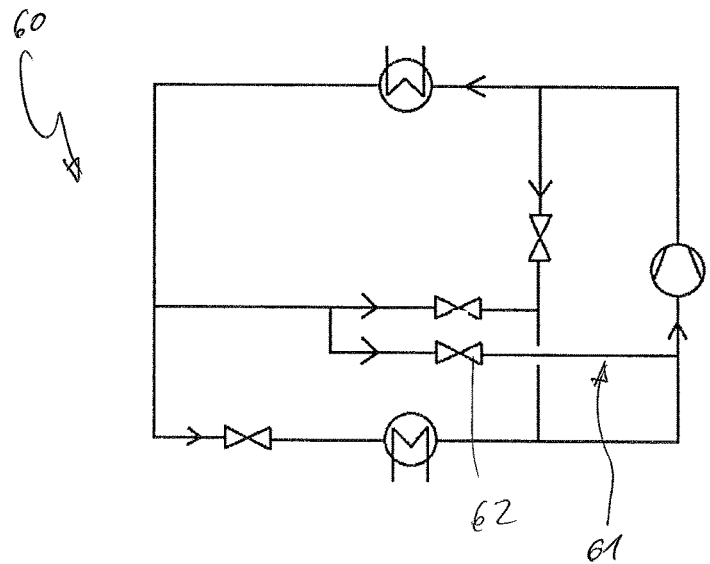
FIG. 10 is a schematic illustration of a ninth embodiment of a cooling device.

FIG. 10 shows a cooling device 60, which differs from the cooling device of FIG. 9 in that it has another bypass 61 comprising another expansion element 62. By means of other expansion element 62, the suction gas temperature and therefore indirectly the compression end temperature can be lowered even further.

Figure 11:
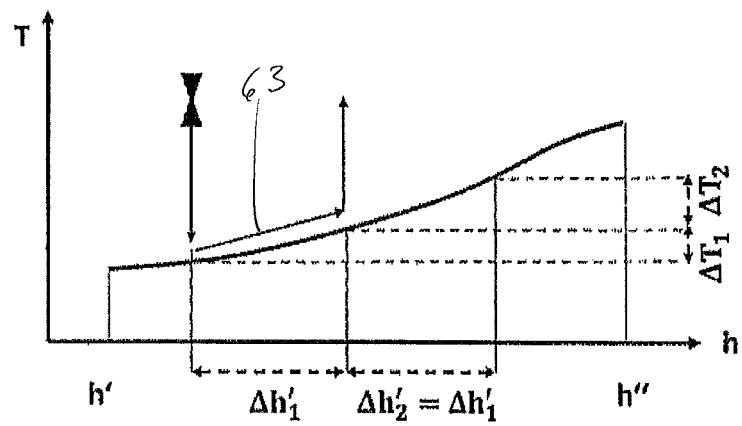
FIG. 11 is a temperature-enthalpy diagram for a refrigerant.

Furthermore, an effective temperature glide of the refrigerant used can be advantageously reduced in all cooling devices based on the cooling devices shown in FIGS. 3 and 8. As can be seen from the diagram of FIG. 11, a temperature glide is not linear, mostly in refrigerants having a temperature glide of >5 K. In FIG. 11, arrow 63 marks a pipe section of a cooling circuit running through a heat exchanger in a test space. A reduction of the effective temperature glide in the heat exchanger can stabilize a test space temperature. Full evaporation is achieved by exploiting an overheating of the refrigerant in the suction line of the compressor, for example. Furthermore, the energy contained in the refrigerant can be ideally utilized by targeted reheating of the refrigerant or by using liquid separators in order to increase installation efficiency.

Figure 12:
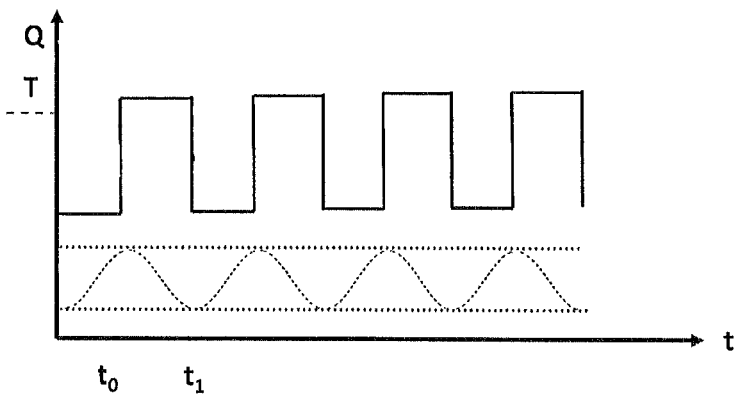
FIG. 12 is a cycle-time diagram for an expansion element.

The diagram shown in FIG. 12 shows a clocked opening and closing of an expansion element during a time interval as another advantageous measure. In this way, a small amount of refrigerants evaporating on a heat exchanger can be fed to the latter when only a relatively low cold capacity is needed in order to maintain a temperature.

Figure 13:
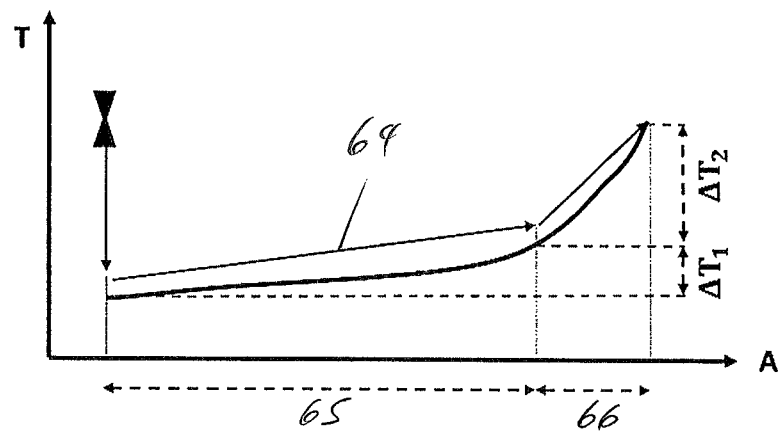
FIG. 13 is a temperature-surface diagram for a cooling circuit.

The diagram shown in FIG. 13 shows the exploitation of an overheating of the refrigerant in a suction line 66 of a compressor. An arrow 64 marks a heat exchanger, more precisely a course of a temperature increase as the refrigerant passes a heat exchanger surface 65 upstream of the suction line, more precisely its surface 66. By means of an electronic expansion element, a temperature is reduced downstream of the heat exchanger while an overheating in the suction line is ensured.

The invention claimed is:

1. A refrigerant for a cooling device having a cooling circuit comprising at least one heat exchanger in which the refrigerant undergoes a phase transition, the refrigerant being a refrigerant mixture composed of 70 to 74 mole percent of carbon dioxide ($CO_2$), 14 to 18 mole percent of 1,1-difluoroethene ($C_2H_2F_2$), 2 to 6 mole percent of pentafluoroethane ($C_2HF_5$), and 5 to 10 mole percent of fluoroform ($CHF_3$).

2. The refrigerant according to claim 1, further including at least one of hexafluoroethane ($C_2F_6$) and difluoromethane ($CH_2F_2$).

3. The refrigerant according to claim 1 further including hexafluoroethane ($C_2F_6$) in an amount ranging from 1 to 30 mole percent.

4. The refrigerant according to claim 1 further including difluoromethane ($CH_2F_2$) in an amount of 1 to 30 mole percent.

5. The refrigerant according to claim 4 further including hexafluoroethane ($C_2F_6$) in an amount of 1 to 30 mole percent.

6. The refrigerant according to claim 1 further including difluoromethane ($CH_2F_2$) in an amount of 1 to 30 mole percent.

7. The refrigerant according to claim 1 further including hexafluoroethane ($C_2F_6$) in an amount of 1 to 30 mole percent.

8. The refrigerant according to claim 1, wherein the refrigerant mixture is composed of four or more components.

9. The refrigerant according to claim 1, wherein the refrigerant mixture further contains fluoromethane ($CH_3F$), ethane ($C_2H_6$), 2,3,3,3-tetrafluoropropene ($C_3H_2F_4$), ethene ($C_2H_4$), fluoroethene ($C_2H_3F$), ethyne ($C_2H_2$), propane ($C_3H_8$), propene ($C_3H_6$) or fluoroethane ($CH_2FCH_3$) in an amount of up to 30 mole percent each.

10. The refrigerant according to claim 1, wherein the refrigerant has a temperature glide of ≤5 K or >5 K.

11. The refrigerant according to claim 1, wherein the refrigerant has a relative CO2 equivalent of <2500 over 100 years or that the refrigerant is nonflammable.

\* \* \* \* \*